(12) United States Patent
Koblents et al.

(10) Patent No.: US 11,762,677 B1
(45) Date of Patent: Sep. 19, 2023

(54) HIGH-LEVEL VECTORIZATION AND SCALARIZATION OF JAVA VECTOR API LIBRARY METHODS

(71) Applicant: International Business Machines Corporation, Armonk, NY (US)

(72) Inventors: Gita Koblents, Toronto (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 17/660,226

(22) Filed: Apr. 22, 2022

(51) Int. Cl.
*G06F 9/44* (2018.01)
*G06F 9/455* (2018.01)

(52) U.S. Cl.
CPC .................. *G06F 9/45525* (2013.01)

(58) Field of Classification Search
CPC .................................. G06F 9/45525
USPC ................................. 717/146–148
See application file for complete search history.

(56) References Cited

U.S. PATENT DOCUMENTS

| | | | | |
|---|---|---|---|---|
| 6,907,417 B2* | 6/2005 | Alpert | ...................... | G06N 5/02 706/55 |
| 8,402,450 B2* | 3/2013 | Ringseth | .................... | G06F 8/45 717/136 |
| 8,966,461 B2* | 2/2015 | Gaster | ..................... | G06F 8/443 717/148 |
| 9,704,277 B2* | 7/2017 | Hamedani | ................. | G06T 9/00 |
| 11,113,293 B2* | 9/2021 | Jin | ...................... | G06F 16/2465 |
| 2013/0086565 A1 | 4/2013 | Gaster et al. | | |
| 2019/0361687 A1 | 11/2019 | Munshi et al. | | |
| 2021/0326389 A1* | 10/2021 | Sankar | ................... | G06N 20/10 |

FOREIGN PATENT DOCUMENTS

WO  WO-2016089242 A1 *  6/2016  ............. G06F 8/445

OTHER PUBLICATIONS

Nie et al., "Vectorization for Java", 2010, IFIP International Federation for Information Processing, 15 pages. (Year: 2010).*
Rohou et al., "Speculatively Vectorized Bytecode", 2011, ACM, pp. 35-44. (Year: 2011).*
Collie et al., "Type-Directed Program Synthesis and Constraint Generation for Library Portability," arXiv:1908.04546v3 [cs.PL], Aug. 22, 2019, 13 pages. https://arxiv.org/pdf/1908.04546.pdf.
Palkar et al., "Weld: Rethinking the Interface Between Data-Intensive Libraries," arXiv:1709.06416v2 [cs.DC], Oct. 24, 2017, 14 pages. https://arxiv.org/pdf/1709.06416.pdf.

* cited by examiner

*Primary Examiner* — Ted T. Vo
(74) *Attorney, Agent, or Firm* — Yee & Associates, P.C.

(57) ABSTRACT

Vectorization and scalarization of methods are provided. A plurality of node webs is constructed based on traversing an intermediate representation of a program. Transitive closure of the plurality of node webs is performed to form a set of final node webs. It is determined that each respective node in the set of final node webs can be converted into one of vector operation code or a sequence of scalar operation codes based on at least one node including a specified vector length and only one vector length value being specified within the set of final node webs. Each respective node in the set of final node webs is converted into one of corresponding vector operation code or a corresponding sequence of scalar operation codes to accelerate execution of supported and unsupported methods of the program.

20 Claims, 8 Drawing Sheets

HIGH-LEVEL VECTORIZATION AND SCALARIZATION OF JAVA VECTOR API LIBRARY METHODS

BACKGROUND

1. Field

The disclosure relates generally to Java programming language and more specifically to vectorization and scalarization of supported and unsupported Java methods included in a Java vector application programming interface (API) library to accelerate execution of the supported and unsupported Java methods on a particular computer platform, thereby increasing performance of that particular computer platform.

2. Description of the Related Art

Java® is a popular programming language. Java is a registered trademark of Oracle America, Inc., Redwood Shores, California (CA). Java is used to develop mobile applications, web applications, desktop applications, games, and the like.

Java is a high-level, class-based, object-oriented programming language that is designed to have as few implementation dependencies as possible. Typically, Java applications are compiled to bytecode that can run on any Java virtual machine (JVM®) regardless of the hosting computer architecture. JVM is a registered trademark of Oracle America, Inc., Redwood Shores, CA. The Java runtime provides dynamic capabilities, such as, for example, reflection and runtime code optimization, which are generally not available in traditional compiled languages.

Java is portable, which means that Java programs should run similarly on any combination of hardware and operating systems with adequate run time support. This portability is achieved by compiling the Java program code to an intermediate representation called Java bytecode, instead of directly to architecture-specific machine code. Java bytecode instructions are analogous to machine code, but the Java bytecode instructions are intended to be executed by a JVM written specifically for the host hardware.

SUMMARY

According to one illustrative embodiment, a computer-implemented method for vectorization and scalarization of methods is provided. A computer constructs a plurality of node webs based on traversing an intermediate representation of a program. The computer performs transitive closure of the plurality of node webs to form a set of final node webs corresponding to the program. The computer determines that each respective node in the set of final node webs corresponding to the program can be converted into one of vector operation code in its intermediate representation or a sequence of scalar operation codes in their intermediate representations based on at least one node including a specified vector length and only one vector length value being specified within the set of final node webs. The computer converts each respective node in the set of final node webs corresponding to the program into one of corresponding vector operation code in its intermediate representation or a corresponding sequence of scalar operation codes in their intermediate representations to accelerate execution of supported and unsupported methods of the program by the computer to increase performance of the computer.

According to other illustrative embodiments, a computer system and computer program product for vectorization and scalarization of methods are provided.

DETAILED DESCRIPTION

Figure 1:
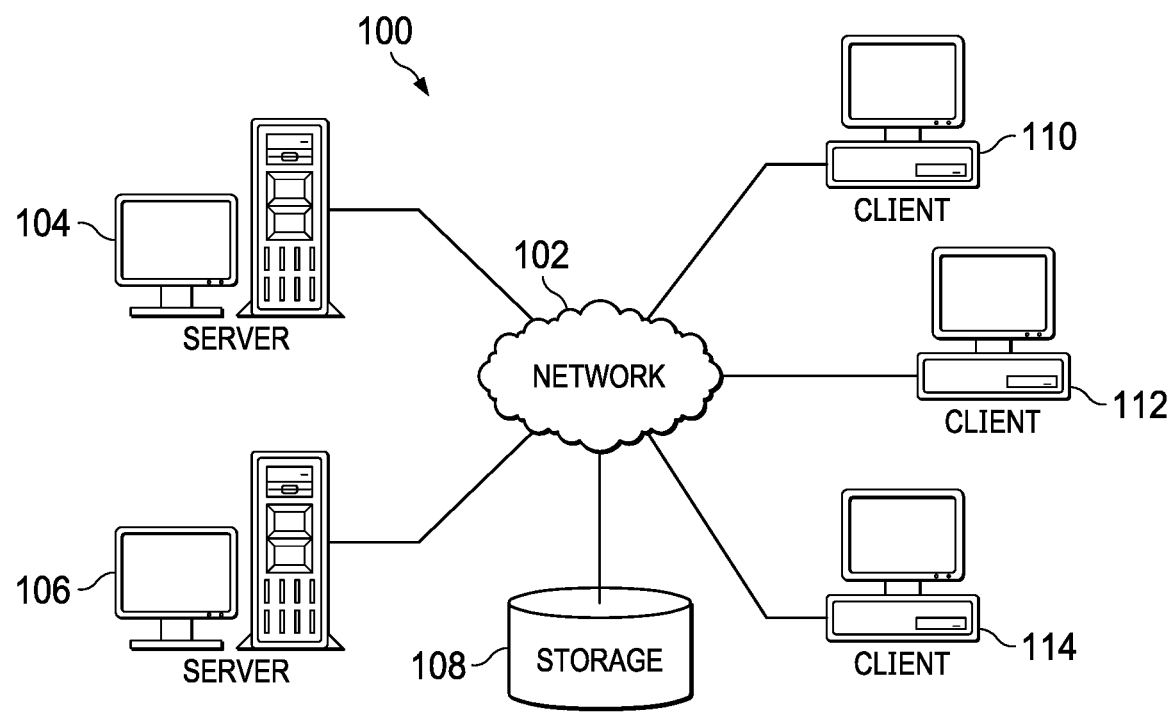
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
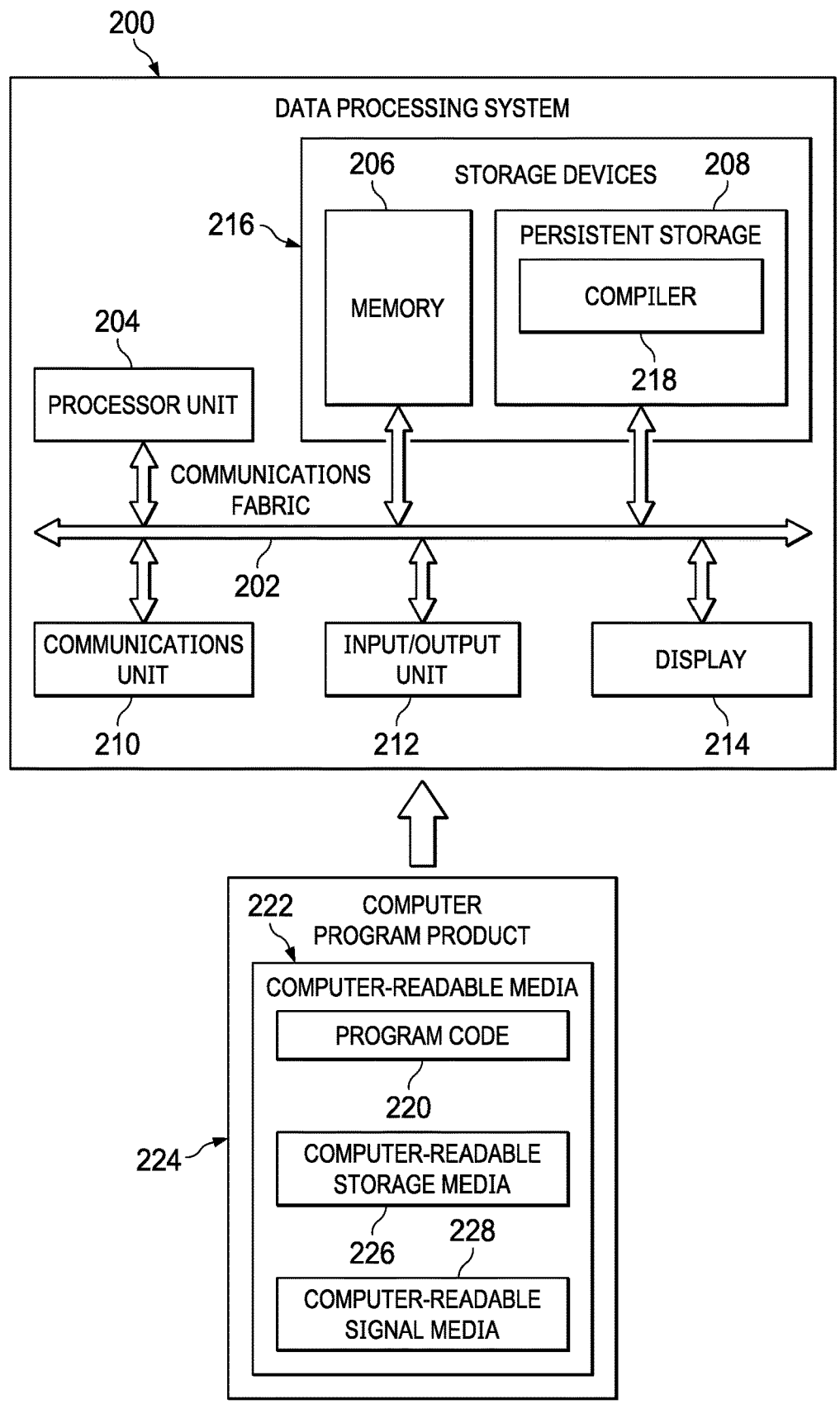
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 provide a set of services, such as, for example, financial services, banking services, governmental services, educational services, healthcare services, reservation services, data services, online gaming services, event monitoring services, and the like, to client devices. Further, server 104 and server 106 perform vectorization and scalarization of supported and unsupported Java methods of Java programs corresponding to the set of services provided by server 104 and server 106. Server 104 and server 106 perform the vectorization of supported Java methods to accelerate execution of those supported Java methods. A supported Java method is a method for which a corresponding vector instruction exists on the target platform (e.g., server 104 and server 106) and generation of such a vector instruction is implemented in a Just-In-Time (JIT) Java compiler. Server 104 and server 106 vectorize the supported Java methods by converting the supported Java methods into corresponding vector operation code in its intermediate representation. Vector operation code is vector hardware instructions that operate on vector data. Server 104 and server 106 perform the scalarization of unsupported Java methods to accelerate execution of those unsupported Java methods. An unsupported Java method is a method that either cannot be represented by a corresponding vector instruction or such a vector instruction is not generated by the JIT Java compiler. Server 104 and server 106 scalarize the unsupported Java methods by converting the unsupported Java methods into corresponding sequences of scalar (e.g., non-vector) operation code in their intermediate representations. Scalar operation code is any non-vector hardware instruction. By performing the vectorization and scalarization of the supported and unsupported Java methods of the Java programs corresponding to the set of services provided by server 104 and server 106, server 104 and server 106 increase performance of server 104 and server 106, themselves, by accelerating execution of those supported and unsupported Java methods.

Client 110, client 112, and client 114 also connect to network 102. Clients 110, 112, and 114 are client devices of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart glasses, smart televisions, smart vehicles, smart appliances, virtual reality devices, gaming devices, kiosks, and the like, with wire or wireless communication links to network 102. Users of clients 110, 112, and 114 may utilize clients 110, 112, and 114 to access and utilize the services provided by server 104 and server 106.

Storage 108 is a network storage device capable of storing any type of data in a structured format or an unstructured format. In addition, storage 108 may represent a plurality of network storage devices. Further, storage 108 may store, for example, a Java vector API library of Java methods used to generate Java programs, a Java methods table indexed by Java method identifiers that contains properties of different Java methods, and the like. Furthermore, storage 108 may store other types of data, such as authentication or credential data that may include usernames, passwords, and the like associated with, for example, Java program developers, system administrators, and client device users.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the Java method vectorization and scalarization processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory, or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores compiler 218. However, it should be noted that even though compiler 218 is illustrated as residing in persistent storage 208, in an alternative illustrative embodiment compiler 218 may be a separate component of data processing system 200. For example, compiler 218 may be a hardware component coupled to communication fabric 202 or a combination of hardware and software components.

Compiler 218 may be, for example, a JIT Java compiler. Compiler 218 controls the vectorization and scalarization processes of illustrative embodiments to accelerate the execution of supported and unsupported Java methods included in a Java vector API library associated with a Java program hosted by data processing system 200. For example, compiler 218 constructs a plurality of node webs based on traversing an intermediate representation of the Java program hosted by data processing system 200. The intermediate representation of the Java program consists of nodes. One node can represent a method call with the associated parameters. Another node can represent an assignment. Based on the nodes in the intermediate representation of the Java program, compiler 218 constructs the plurality of node webs. A node web is a subset of nodes that have a relationship (e.g., connected or related in some way). For example, the relationship can be that a method represented by one node is used by another method represented by another node. Afterward, compiler 218 performs transitive closure of the plurality of node webs forming a set of larger final node webs corresponding to the Java program.

Based on at least one node in the set of final node webs including a specified vector length and only one vector length value being specified within the set of final node webs, compiler 218 validates that each respective web node in the set of final node webs corresponding to the Java program can be converted into one of vector operation code in its intermediate representation or a sequence of scalar operation codes in their intermediate representations. Then, compiler 218 transforms each respective node in the set of final node webs corresponding to the Java program into one of corresponding vector operation code in its intermediate representation for supported Java methods by data processing system 200 or a corresponding sequence of scalar operation codes in their intermediate representations for unsupported Java methods by data processing system 200 to accelerate execution of the supported and unsupported Java methods of the Java program by data processing system 200 to increase performance of data processing system 200, itself.

As a result, data processing system 200 operates as a special purpose computer system in which compiler 218 in data processing system 200 enables the vectorization and scalarization of supported and unsupported Java methods. In particular, compiler 218 transforms data processing system 200 into a special purpose computer system as compared to currently available general computer systems that do not have compiler 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity, Bluetooth® technology, global system for mobile communications, code division multiple access, second-generation, third-generation, fourth-generation, fourth-generation Long Term Evolution, Long Term Evolution Advanced, fifth-generation, or any other wireless communication technology or standard to establish a wireless communications link for data processing system 200. Bluetooth is a registered trademark of Bluetooth Sig, Inc., Kirkland, Washington.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Java programming language adheres to the principal of "write once, run anywhere." Write once, run anywhere means that a Java program can be written on any computer platform and then executed on any other computer platform where a JVM is available. A Java compiler compiles the Java program into bytecodes, which in turn are interpreted by the JVM. In such a scenario, a JIT Java compiler is recommended. The JIT Java compiler recognizes frequently executed Java methods and compiles the Java methods to computer platform native machine language instructions during execution of the Java program. For example, the JIT Java compiler allows a Java program to start and run while the generated bytecode is not highly optimized for the hosting computer platform. The JIT Java compiler is used whenever a Java method is called, and the JIT Java compiler compiles the bytecode of that called Java method into native machine code, thereby compiling that called Java method "just in time" to execute. After the JIT Java compiler compiles that called Java method, the JVM calls that Java method's compiled code directly instead of trying to interpret it, which makes running of the Java program faster.

The more efficiently the JIT Java compiler exploits new hardware features of a particular computer platform, the faster the Java program can execute on that particular computer platform. One new processor feature is Single Instruction, Multiple Data (SIMD). SIMD is a form of parallel processing. SIMD describes computer platforms with multiple processor units that perform the same operation on multiple data points simultaneously. In other words, there are simultaneous (parallel) computations, but each processor unit performs the exact same instruction at any given moment just with different data. For example, if a SIMD computer platform loads eight data points at once, the add operation being applied to the data will happen to all eight values at the same time.

SIMD allows Java programs to execute vector instructions on vector data. The vector data reside, for example, in a vector hardware register, in memory, or the like. Vector data consist of multiple elements of the same scalar data type (e.g., a byte data type, short data type, integer data type, long data type, floating point data type, and double-precision floating point data type) and vector instructions process all elements of the vector data at the same time. Vector instructions are a class of instructions that enable parallel processing of vector data. For example, a vector instruction can process a plurality of elements (e.g., integers or floating-point numbers) in an array in a single operation depending on the length of the vector, which, in turn, improves both computer platform performance and power efficiency.

The Java vector API library enables Java program developers to exploit vector instructions in Java programs. Vector instructions are useful in machine learning algorithms. However, two main challenges exist. The first challenge is how to represent vector data and vector instructions at the Java programming language level. The second challenge is how to convert the high-level representation of the Java program to vector instructions in vector hardware registers by the JIT Java compiler.

Adding a new vector type to Java program bytecodes is impractical because the number of elements in each vector can vary across computer platforms and each computer platform can have vectors of different lengths, which can change in length in the future. A vector implements a dynamic array. For example, a vector is useful when the size of an array is unknown in advance or an array that can change size over the lifetime of a Java program is needed. In other words, a vector class enables resizable-arrays. Thus, n-number of elements can be stored in a vector. The vector length defines the size, in bits, of the vector. For example, vector lengths can correspond to vector sizes of 64 bits, 128 bits, 256 bits, 512 bits, and the like. The length of the vector determines how an instance of a vector is mapped to a vector hardware register when the JIT Java compiler compiles vector computations.

Furthermore, because the Java programming language is a high-level programming language, vector instructions cannot be represented directly in a Java program. To address the first challenge of how to represent vector data and vector instructions at the Java programming language level, the Java vector API library introduces vector classes, such as, for example, a byte vector class, short vector class, integer vector class, long vector class, float vector class, and double-precision float vector class. In other words, the Java vector API library provides a vector class for each respective scalar data type. The Java vector API library is comprised of a plurality of Java methods, which a Java program developer can utilize to create a Java program. Java methods for a vector class may include, for example, an add elements to vector method, get elements of vector method, replace elements in vector method, remove elements from vector method, and the like. Further, the Java vector API library also introduces a vector species class, which contains the length of the vector represented in bits (e.g., 64 bits, 128 bits, 256 bits, 512 bits, or the like).

When the JIT Java compiler generates a vector object (e.g., by reading several elements from an array) both vector class and vector species need to be specified. It should be noted that a vector class is known at compile time, while a vector species is a run time parameter. Vector instructions are represented by various Java methods of the vector classes.

To address the second challenge of how to convert the high-level representation of the Java program to vector instructions in vector hardware registers by the JIT Java compiler, the Java vector API library provides the JIT Java compiler with hints in the form of annotations, such as, for example, @Forceinline, @Stable, @IntrisicCandidate, and the like. The Java vector API library applies these annotations to both high-level methods visible to a user and many layers of the internal library methods. However, two key issues exist with this current approach.

The first issue with the current approach is that the JIT Java compiler needs to apply multiple non-trivial optimizations in order to take advantage of these annotations provided by the Java vector API library. By the JIT Java compiler applying all these non-trivial optimizations, the overall execution time of the Java program is increased. Also, due to the complexity of the optimizations that need to be aligned properly, the desired result may not always be guaranteed, and the desired result may be sensitive to any changes in the library internal implementation.

The second issue with the current approach is that when a computer platform does not support vector instructions corresponding to particular library methods or the JIT Java compiler does not yet have the ability to exploit those vector instructions corresponding to those particular library methods, those particular library methods will run slowly due to the many layers of abstraction in the Java vector API library (e.g., allocation of vector objects on the Java heap space, virtual and interface method invocations, executing vector operations on each lane in a loop with unknown length, and the like). Due to this second issue with the current approach, it has been observed that library methods not vectorized by the JIT Java compiler run up to 100 times slower than similar library methods that are vectorized.

Thus, the current Java vector API library design is a complex, compiler-based approach for recognizing and converting library methods into a computer platform native machine code representation. Also, a straightforward approach of handling unsupported library methods would be inefficient. For example, the unsupported library methods would not be recognized by the JIT Java compiler and, therefore, would run very slowly. Alternatively, the unsupported library methods could be vectorized into an intermediate representation and then vector instructions would be simulated with scalar instructions during bytecode generation. However, vectorization of unsupported library methods into an intermediate representation and then simulating vector instructions with scalar instructions during bytecode generation would require introduction of new vector intermediate representation operation codes and data types. Because these new vector intermediate representation operation codes will be expanded during bytecode generation, the common instructions across those operation codes may be difficult to optimize. An intermediate representation is a data structure, such as, for example, a graph structure comprised of nodes and edges, that a JIT Java compiler utilizes to represent Java program code. An intermediate representation is designed for further processing, such as, for example, flow analysis and optimization. An operation code (also known as instruction machine code, instruction code, instruction syllable, instruction parcel, or operation string) is a portion of a machine language instruction that specifies the operation to be performed.

Illustrative embodiments take into account and address the issues with the current approach above. For example, to address the first issue with the current approach, illustrative embodiments instead of applying various optimizations, such as, for example, inlining, de-virtualization, and type propagation, while using the library hints provided as annotations, illustrative embodiments recognize the Java methods of the Java vector API library at the top-most level instead of at a lower level of program core intrinsics. Illustrative embodiments are able to recognize the Java vector API library methods at the top-most level because the JIT Java compiler can automatically recognize the methods through multiple passes of various optimizations at the program high-level. For example, illustrative embodiments do not need to perform inline optimization of all the library methods up to where the Java vector API library queries the vector length and then constantly folds that query to determine the length of a particular vector. Instead, illustrative embodiments utilize the JIT Java compiler to query the vector length on demand, on a high level, when the JIT Java compiler identifies a vector species class being passed as an argument to a library method that generates that particular vector. This is possible because the vector species class is usually stored in a final static variable in the Java program. In response to the JIT Java compiler determining the scalar data type (e.g., vector class), as well as the vector length (e.g., vector species class), the JIT Java compiler can immediately convert the library method into a corresponding vector operation code in its intermediate representation.

To address the second issue with the current approach, illustrative embodiments utilize scalarization. In this scalarization process, illustrative embodiments perform the steps associated with addressing the first issue with the current approach above. However, when a particular computer platform does not support vectorization of a particular library method, illustrative embodiments convert that particular library method into a sequence of scalar (e.g., non-vector) operation codes in their intermediate representations. This is possible because the library methods are already implemented in Java inside the library and eventually would be executed by the existing Java bytecodes. Illustrative embodiments map the high-level Java program code (i.e., that particular library method) to the corresponding sequence of scalar operation codes in their intermediate representations as soon as possible.

Illustrative embodiments first assign a unique method identifier to each respective library method in the Java vector API library that is recognized by the JIT Java compiler. This unique method identifier enables illustrative embodiments to identify each recognized library method in its intermediate representation. Illustrative embodiments add all the library methods in the Java vector API library to a method table, which is indexed by the unique method identifiers corresponding to the library methods. The method table also contains various method properties, such as, for example, which library method argument, if any, takes a vector species class as a parameter, whether a particular library method returns a vector object, whether a particular library method is supported on a particular computer platform, and the like.

Prior to the JIT Java compiler performing a set of compilation optimizations, illustrative embodiments traverse Java program code in an intermediate representation to perform at least one of multiple different web construction options. In one option, in response to illustrative embodiments determining that a node of the intermediate representation of the Java program code is a call to a recognized method in the Java vector API library, illustrative embodiments place that particular library method and its associated set of vector object reference arguments into a plurality of web nodes comprising a web of related nodes. A vector object reference argument is a reference to a Java object that is used as an argument of its associated Java method and the Java object represents a vector in a Java program. A web node comprises, for example, an identifier, symbol reference number, or the like that corresponds to the library method or vector object reference argument that is represented by that particular web node. In other words, each respective web node of the constructed web of related nodes contains either the library method or one vector object reference argument of the set of vector object reference arguments.

In another option, in response to illustrative embodiments determining that a node of the intermediate representation of the Java program code is a call to another recognized method in the Java vector API library and its associated vector object reference argument is a vector species based on information contained in the method table, illustrative embodiments place that library method and its associated vector object reference argument that is a vector species into web nodes comprising another web of related nodes. In addition, illustrative embodiments query the vector length of the vector species and record the vector length as a property of the web node corresponding to that particular vector object reference argument in the second web of related nodes.

In yet another option, in response to illustrative embodiments determining that a node of the intermediate representation of the Java program represents an assignment of one object symbol reference to another object symbol reference (e.g., not necessary vector object references), illustrative embodiments place both a right hand side node and a left hand side node of the assignment into a new web of nodes comprising another web of related nodes. It should be noted that the intermediate representation of the Java program can include different nodes such as a method call node and an assignment node. Also, a node can be related to several nodes (e.g., a node can have a set of child nodes). For example, a method call node can have child nodes that represent arguments. An assignment has one node that represents the left hand side of the assignment and a child node that represents the right hand side of the assignment. The right hand side node of the assignment can represent a method call or a reference to an object.

In yet another option, in response to illustrative embodiments determining that a node of the intermediate representation of the Java program code is an assignment of a result of a method call to an object symbol reference, illustrative embodiments place both nodes representing the method call and the object symbol reference into another new web of nodes comprising another web of related nodes. It should be noted that during original web construction (i.e., before taking transitive closure) illustrative embodiments place all pairs of nodes into some new, small web of related nodes.

In yet another option, in response to illustrative embodiments determining that a node of the intermediate representation of the Java program code is a call to an unrecognized method, illustrative embodiments invalidate a set of vector object reference arguments associated with that unrecognized method and place their corresponding web nodes in an invalid web of related nodes.

In response to illustrative embodiments determining that traversal of the intermediate representation of the Java program code is completed, illustrative embodiments perform a transitive closure of all constructed webs of related nodes to form a set of final node webs. It should be noted that illustrative embodiments can perform the transitive closure in a context insensitive manner or using use-definition chains. In the set of final node webs formed by the transitive closure of all the constructed webs, illustrative embodiments determine whether an invalid web is included in the set of final node webs. In response to illustrative embodiments determining that an invalid web is included in the set of final node webs, illustrative embodiments stop the vectorization and scalarization process.

In response to illustrative embodiments determining that an invalid web is not included in the set of final node webs, illustrative embodiments determine whether at least one final web node includes a specified vector length and only one vector length value is specified within the set of final node webs. In response to illustrative embodiments determining that these vector length conditions are met in the set of final node webs, illustrative embodiments validate the set of final node webs and determine that all library methods and their associated vector object reference arguments in respective nodes of the set of final node webs can be converted into either a corresponding vector operation code in its intermediate representation or a corresponding sequence of scalar (e.g., non-vector) operation codes in their intermediate representations using the specified vector length.

In response to determining that vectorization of a particular library method in the set of final node webs is supported on a particular computer platform, illustrative embodiments convert that particular library method into corresponding vector operation code in its intermediate representation using the specified vector length. In response to determining that vectorization of that particular library method in the set of final node webs is unsupported on that particular computer platform, illustrative embodiments convert that particular library method into a sequence of scalar operation codes in their intermediate representations using the specified vector length.

In addition, sometimes compiled bytecode needs to be transferred back to the JVM for interpretation. During such transition points, illustrative embodiments reconstruct all live vector objects on the Java heap space from their intermediate representations (e.g., a single vector type temporary or a plurality of scalar type temporaries) for the JVM to read.

As a result, illustrative embodiments convert the Java vector API library methods into intermediate representations that closely represent a native machine code implementation for a particular computer platform quickly and efficiently, while accelerating execution of both supported and unsupported library methods on that particular computer platform. It should be noted that illustrative embodiments can optimize the transformation by using the same code to expand similar library methods. For example, illustrative embodiments can implement expansion of binary library methods using the same parameterized routine for all vector types and lengths. As a result, illustrative embodiments can obtain faster execution (e.g., up to 100 times) on library methods that illustrative embodiments do not vectorize.

Thus, illustrative embodiments provide one or more technical solutions that overcome a technical problem with slow execution of Java methods. As a result, these one or more technical solutions provide a technical effect and practical application in the field of software optimization.

Figure 3:
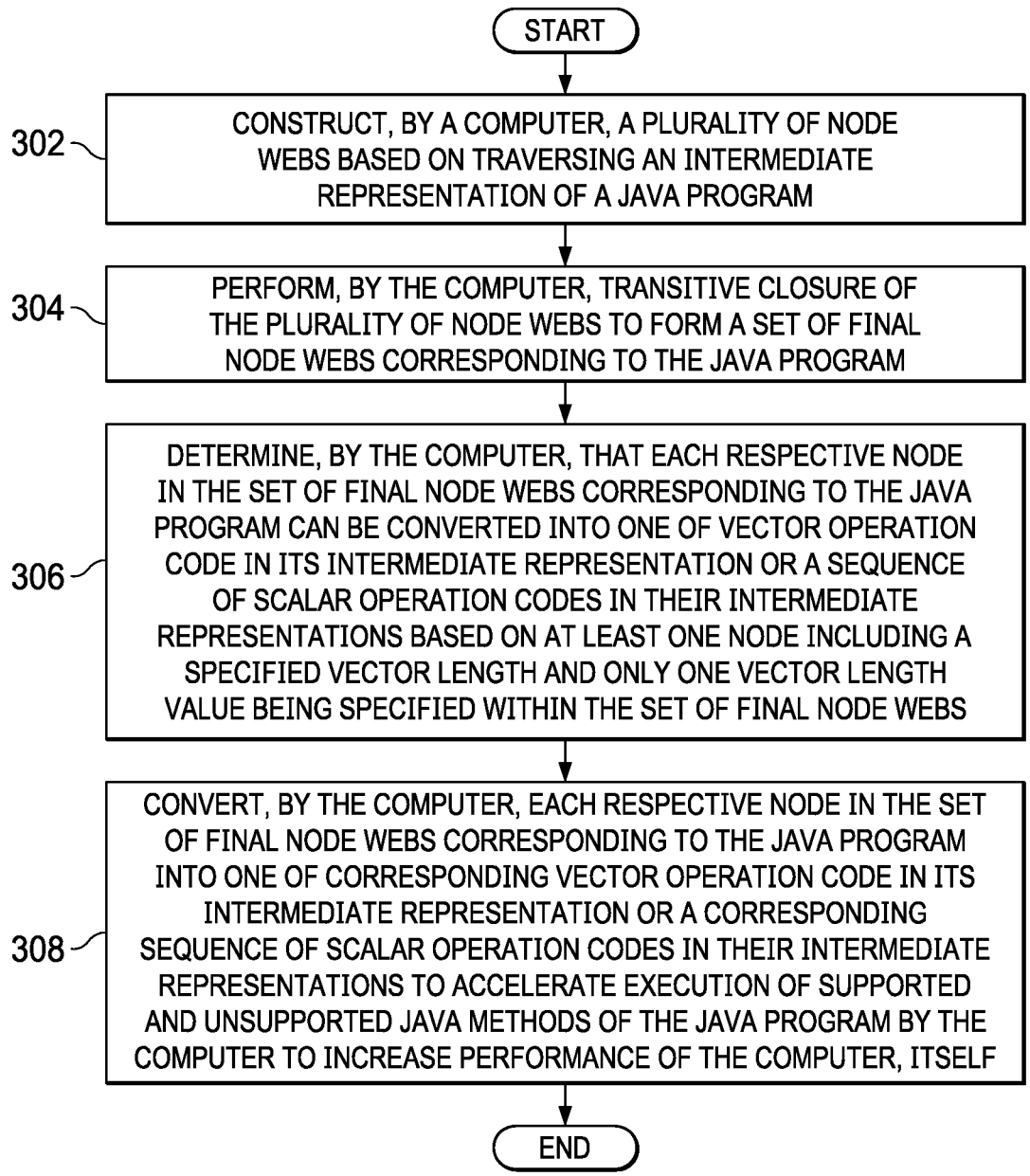
FIG. 3 is a flowchart illustrating a process for vectorization and scalarization of Java vector API library methods in accordance with an illustrative embodiment.
Figure 4A:
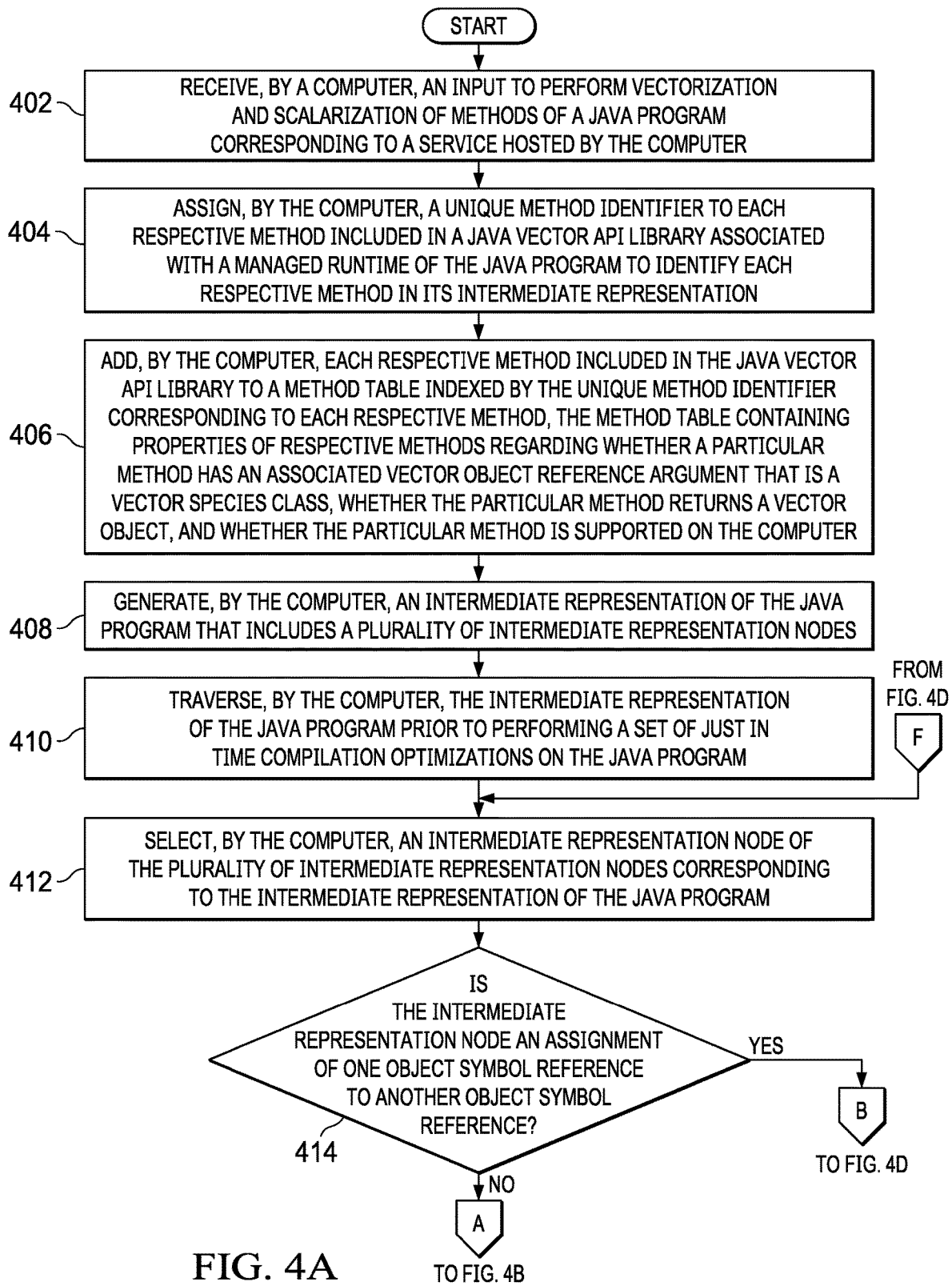
FIGS. 4A-4E are a flowchart illustrating a process for accelerating execution of supported and unsupported Java methods in accordance with an illustrative embodiment.
Figure 4B:
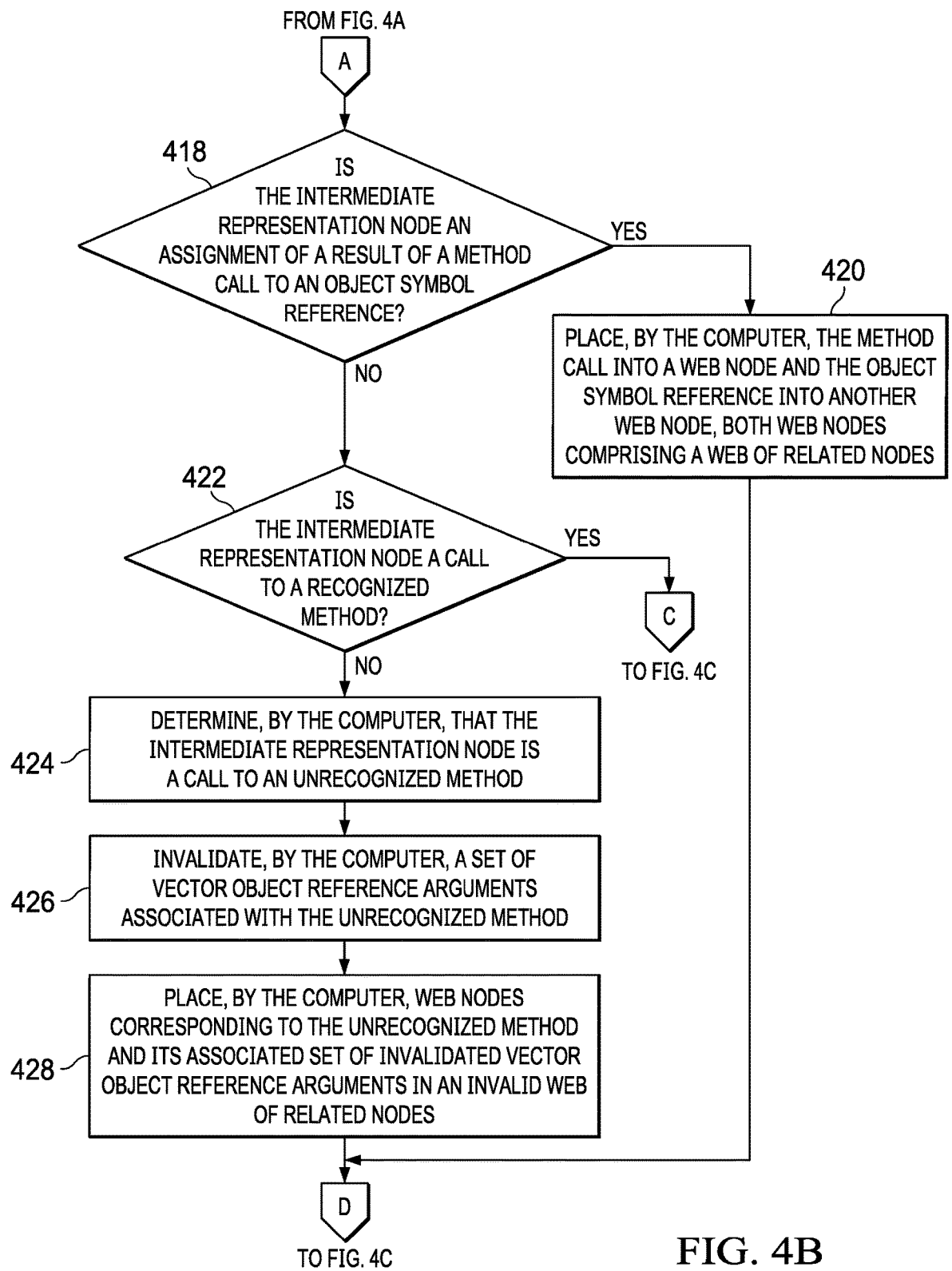
Figure 4C:
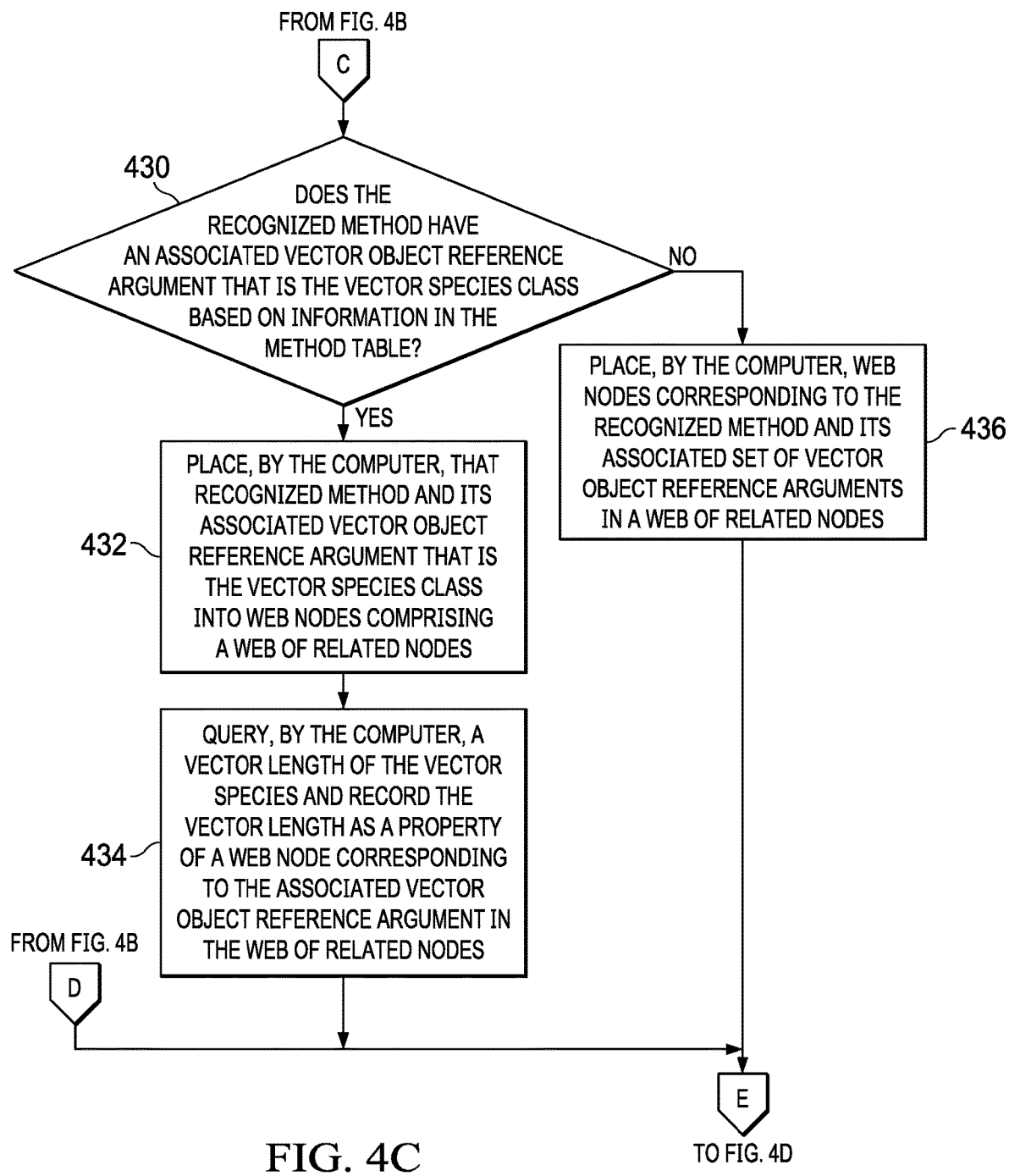
Figure 4D:
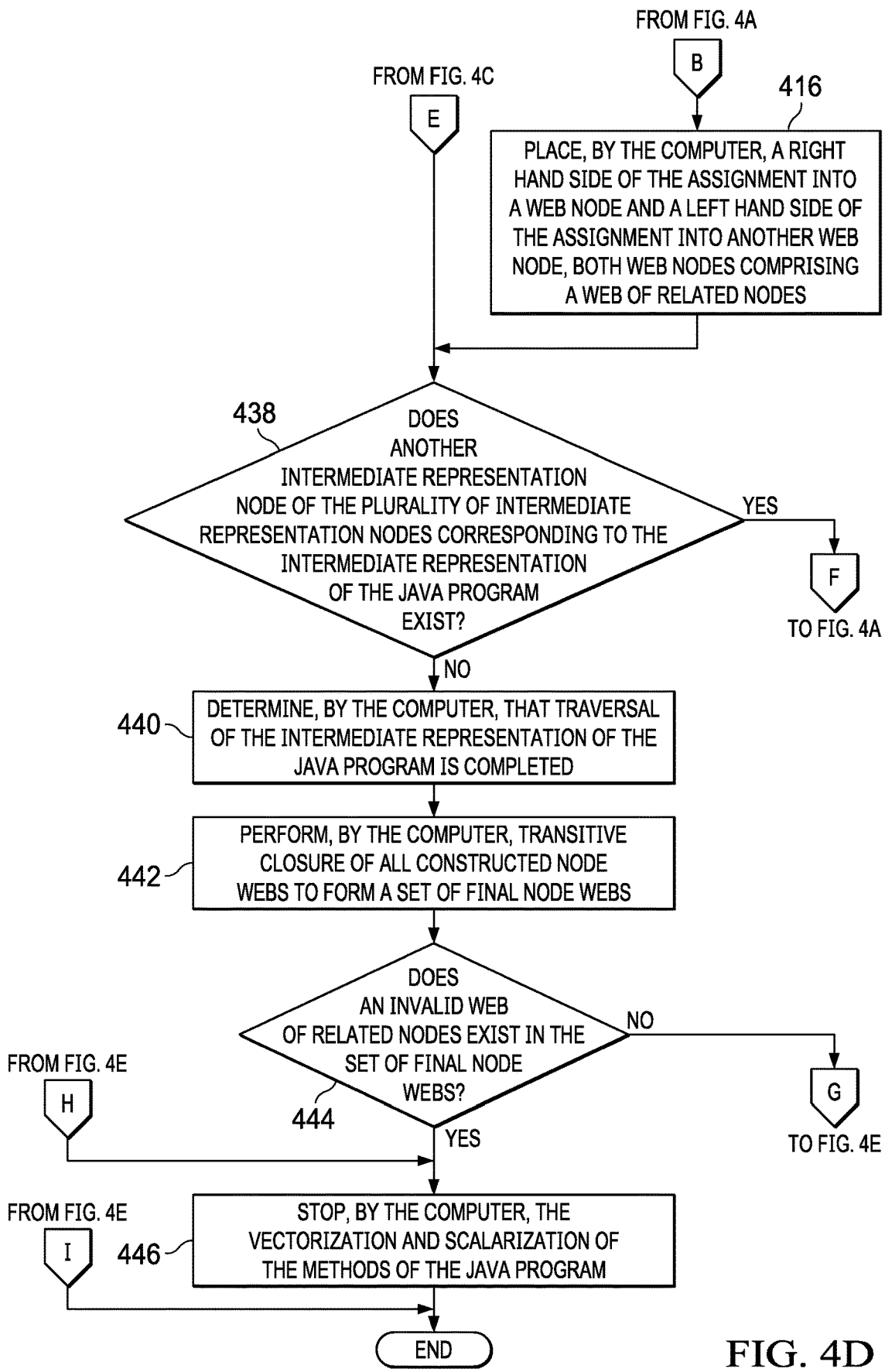
Figure 4E:
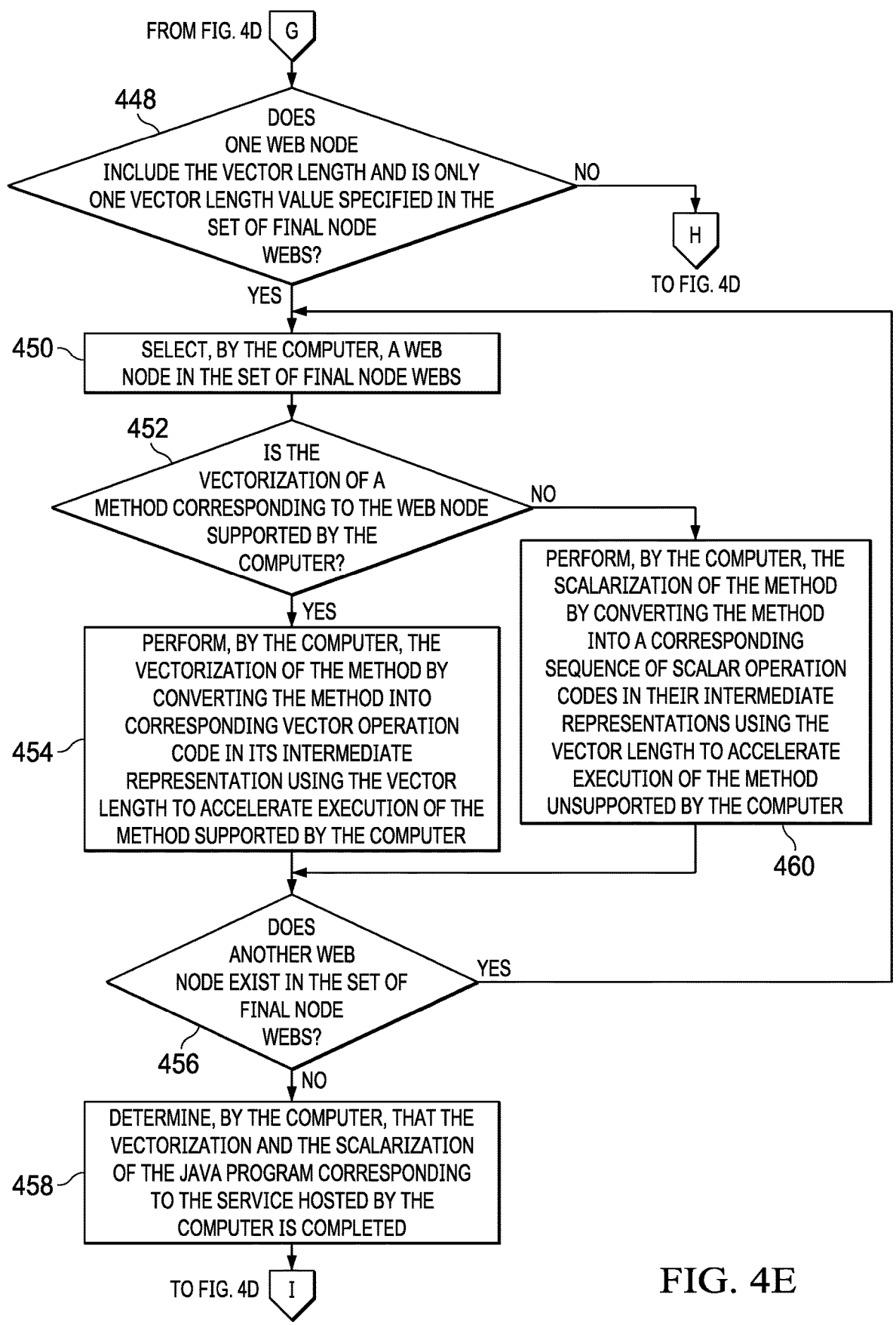

With reference now to FIG. 3, a flowchart illustrating a process for vectorization and scalarization of Java vector API library methods is shown in accordance with an illustrative embodiment. The process shown in FIG. 3 may be implemented in a computer, such as, for example, server 104 in FIG. 1 or data processing system 200 in FIG. 2. For example, the process shown in FIG. 3 may be implemented in compiler 218 in FIG. 2.

The process begins when the computer constructs a plurality of node webs based on traversing an intermediate representation of a Java program (step 302). In response to completing construction of the plurality of node webs, the computer performs transitive closure of the plurality of node webs to form a set of final node webs corresponding to the Java program (step 304).

Afterward, the computer determines that each respective node in the set of final node webs corresponding to the Java program can be converted into one of vector operation code in its intermediate representation or a sequence of scalar operation codes in their intermediate representations based on at least one node including a specified vector length and only one vector length value being specified within the set of final node webs (step 306). The computer converts each respective node in the set of final node webs corresponding to the Java program into one of corresponding vector operation code in its intermediate representation or a corresponding sequence of scalar operation codes in their intermediate representations to accelerate execution of supported and unsupported Java methods of the Java program by the computer to increase performance of the computer, itself (step 308). Thereafter, the process terminates.

With reference now to FIGS. 4A-4E, a flowchart illustrating a process for accelerating execution of supported and unsupported Java methods is shown in accordance with an illustrative embodiment. The process shown in FIGS. 4A-4E may be implemented in a computer, such as, for example, server 104 in FIG. 1 or data processing system 200 in FIG. 2. For example, the process shown in FIGS. 4A-4E may be implemented in compiler 218 in FIG. 2.

The process begins when the computer receives an input to perform vectorization and scalarization of methods of a Java program corresponding to a service hosted by the computer (step 402). In response to receiving the input to perform the vectorization and scalarization of the methods of the Java program, the computer assigns a unique method identifier to each respective method included in a Java vector API library associated with a managed runtime of the Java program to identify each respective method in its intermediate representation (step 404).

In addition, the computer adds each respective method included in the Java vector API library to a method table indexed by the unique method identifier corresponding to each respective method (step 406). The method table containing properties of respective methods regarding whether a particular method has an associated vector object reference argument that is a vector species class, whether the particular method returns a vector object, and whether the particular method is supported on the computer.

Further, the computer generates an intermediate representation of the Java program that includes a plurality of intermediate representation nodes and connecting edges in a form of a graph (step 408). Furthermore, the computer traverses the intermediate representation of the Java program prior to performing a set of just in time compilation optimizations on the Java program (step 410).

The computer selects an intermediate representation node of the plurality of intermediate representation nodes corresponding to the intermediate representation of the Java program (step 412). The computer makes a determination as to whether the intermediate representation node is an assignment of one object symbol reference to another object symbol reference (step 414).

If the computer determines that the intermediate representation node is an assignment of one object symbol reference to another object symbol reference, yes output of step 414, then the computer places a right hand side of the assignment into a web node and a left hand side of the assignment into another web node, both web nodes comprising a web of related nodes (step 416). Thereafter, the process proceeds to step 438.

If the computer determines that the intermediate representation node is not an assignment of one object symbol reference to another object symbol reference, no output of step 414, then the computer makes a determination as to whether the intermediate representation node is an assignment of a result of a method call to an object symbol reference (step 418). If the computer determines that the intermediate representation node is an assignment of a result of a method call to an object symbol reference, yes output of step 418, then the computer places the method call into a web node and the object symbol reference into another web node, both web nodes comprising a web of related nodes (step 420). Thereafter, the process proceeds to step 438.

If the computer determines that the intermediate representation node is not an assignment of a result of a method call to an object symbol reference, no output of step 418, then the computer makes a determination as to whether the intermediate representation node is a call to a recognized method (step 422). The Java vector API library is comprised of many Java methods and new ones are added. Users, such as, for example, Java program developers, can select certain Java methods in the library that the users want to have processed (e.g., either vectorized or scalarized) and those selected Java methods are considered recognized methods.

If the computer determines that the intermediate representation node is not a call to a recognized method by the computer, no output of step 422, then the computer determines that the intermediate representation node is a call to an unrecognized method (step 424). The users do not want some of the Java methods included in the Java vector API library to be processed (e.g., neither vectorized nor scalarized), at least not yet. These unselected Java methods in the library are considered unrecognized methods. The computer invalidates a set of vector object reference arguments associated with the unrecognized method (step 426). Afterward, the computer places web nodes corresponding to the unrecognized method and its associated set of invalidated vector object reference arguments in an invalid web of related nodes (step 428). Thereafter, the process proceeds to step 438.

Returning again to step 422, if the computer determines that the intermediate representation node is a call to a recognized method, yes output of step 422, then the computer makes a determination as to whether the recognized method has an associated vector object reference argument that is the vector species class based on information in the method table (step 430). If the computer determines that the recognized method does have an associated vector object reference argument that is the vector species class based on the information in the method table, yes output of step 430, then the computer places that recognized method and its associated vector object reference argument that is the vector species class into web nodes comprising a web of related nodes (step 432). Moreover, the computer queries a vector length of the vector species and records the vector length as a property of a web node corresponding to the associated vector object reference argument in the web of related nodes (step 434). Thereafter, the process proceeds to step 438.

Returning again to step 430, if the computer determines that the recognized method does not have an associated vector object reference argument that is the vector species class based on the information in the method table, no output of step 430, then the computer places web nodes corresponding to the recognized method and its associated set of vector object reference arguments in a web of related nodes (step 436). Afterward, the computer makes a determination as to whether another intermediate representation node of the plurality of intermediate representation nodes corresponding to the intermediate representation of the Java program exists (step 438).

If the computer determines that another intermediate representation node of the plurality of intermediate representation nodes corresponding to the intermediate representation of the Java program does exist, yes output of step 438, then the process returns to step 412 where the computer selects another intermediate representation node in the intermediate representation of the Java program. If the computer determines that another intermediate representation node of the plurality of intermediate representation nodes corresponding to the intermediate representation of the Java program does not exist, no output of step 438, then the computer determines that traversal of the intermediate representation of the Java program is completed (step 440).

In response to determining that the traversal of the intermediate representation of the Java program is completed, the computer performs transitive closure of all constructed node webs to form a set of final node webs (step 442). Afterward, the computer makes a determination as to whether an invalid web of related nodes exists in the set of final node webs (step 444).

If the computer determines that an invalid web of related nodes does exist in the set of final node webs, yes output of step 444, then the computer stops the vectorization and scalarization of the Java program (step 446). Thereafter, the process terminates.

Returning again to step 444, if the computer determines that an invalid web of related nodes does not exist in the set of final node webs, no output of step 444, then the computer makes a determination as to whether one web node includes the vector length and only one vector length value is specified in the set of final node webs (step 448). If the computer determines that no web node includes the vector length, no output of step 448, then the process returns to step 446 where the computer stops the vectorization and scalarization of the Java program. If the computer determines that one web node does include the vector length and only one vector length value is specified in the set of final node webs, yes output of step 448, then the computer selects a web node in the set of final node webs (step 450).

In response to selecting the web node, the computer makes a determination as to whether the vectorization of a method corresponding to the selected web node is supported by the computer (step 452). If the computer determines that the vectorization of the method corresponding to the selected web node is supported by the computer, yes output of step 452, then the computer performs the vectorization of the method by converting the method into corresponding vector operation code in its intermediate representation using the vector length to accelerate execution of the method supported by the computer (step 454).

Afterward, the computer makes a determination as to whether another web node exists in the set of final node webs (step 456). If the computer determines that another web node does exist in the set of final node webs, yes output of step 456, then the process returns to step 450 where the computer selects another web node in the set of final node webs. If the computer determines that another web node does not exist in the set of final node webs, no output of step 456, then the computer determines that the vectorization and the scalarization of the Java program corresponding to the service hosted by the computer is completed (step 458). Thereafter, the process terminates.

Returning again to step 452, if the computer determines that the vectorization of the method corresponding to the selected web node is unsupported by the computer, no output of step 452, then the computer performs the scalarization of the method by converting the method into a corresponding sequence of scalar operation codes in their intermediate representations using the vector length to accelerate execution of the method unsupported by the computer (step 460). Thereafter, the process returns to step 456 where the computer determines whether another web node exists in the final node web.

Thus, illustrative embodiments of the present invention provide a computer-implemented method, computer system, and computer program product for the vectorization and scalarization of supported and unsupported Java methods included in a Java vector API library to accelerate execution of the supported and unsupported Java methods on a particular computer platform, thereby increasing performance of that particular computer platform. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for vectorization and scalarization of methods, the computer-implemented method comprising:
   constructing, by a computer, a plurality of node webs based on traversing an intermediate representation of a program;
   performing, by the computer, transitive closure of the plurality of node webs to form a set of final node webs corresponding to the program;
   determining, by the computer, that each respective node in the set of final node webs corresponding to the program can be converted into one of vector operation code in its intermediate representation or a sequence of scalar operation codes in their intermediate representations based on at least one node including a specified vector length and only one vector length value being specified within the set of final node webs; and
   converting, by the computer, each respective node in the set of final node webs corresponding to the program into one of corresponding vector operation code in its intermediate representation or a corresponding sequence of scalar operation codes in their intermediate representations to accelerate execution of supported and unsupported methods of the program by the computer to increase performance of the computer.

2. The computer-implemented method of claim 1 further comprising:
   receiving, by the computer, an input to perform the vectorization and the scalarization of the methods of the program, the program corresponding to a service hosted by the computer;
   assigning, by the computer, a method identifier to each method included in an application programming interface library associated with the program to identify each respective method in its intermediate representation; and
   adding, by the computer, each method included in the application programming interface library associated with the program to a method table indexed by the method identifier corresponding to each respective method, the method table containing properties of respective methods regarding whether a particular method has an associated vector object reference argument that is a vector species class, whether the particular method returns a vector object, and whether the particular method is supported on the computer.

3. The computer-implemented method of claim 1 further comprising:
generating, by the computer, an intermediate representation of the program that includes a plurality of intermediate representation nodes;
traversing, by the computer, the intermediate representation of the program prior to performing a set of just in time compilation optimizations on the program; and
selecting, by the computer, an intermediate representation node of the plurality of intermediate representation nodes corresponding to the intermediate representation of the program.

4. The computer-implemented method of claim 3 further comprising:
determining, by the computer, whether the intermediate representation node is a call to a recognized method;
responsive to the computer determining that the intermediate representation node is not a call to a recognized method, determining, by the computer, that the intermediate representation node is a call to an unrecognized method by the computer;
invalidating, by the computer, a set of vector object reference arguments associated with the unrecognized method; and
placing, by the computer, web nodes corresponding to the unrecognized method and its associated set of invalidated vector object reference arguments in an invalid web of related nodes.

5. The computer-implemented method of claim 3 further comprising:
determining, by the computer, whether the intermediate representation node is a call to a recognized method; and
responsive to the computer determining that the intermediate representation node is a call to a recognized method, placing, by the computer, web nodes corresponding to the recognized method and its associated set of vector object reference arguments in a web of related nodes.

6. The computer-implemented method of claim 3 further comprising:
determining, by the computer, whether the intermediate representation node is a call to a recognized method;
responsive to the computer determining that the intermediate representation node is a call to a recognized method, determining, by the computer, whether the recognized method has an associated vector object reference argument that is a vector species class based on information in a method table;
responsive to the computer determining that the recognized method does have an associated vector object reference argument that is the vector species class based on the information in the method table, placing, by the computer, the recognized method and its associated vector object reference argument that is the vector species class into web nodes comprising a web of related nodes; and
querying, by the computer, a vector length of the vector species and recording the vector length as a property of a web node corresponding to the associated vector object reference argument in the web of related nodes.

7. The computer-implemented method of claim 3 further comprising:
determining, by the computer, whether the intermediate representation node is an assignment of one object symbol reference to another object symbol reference; and
responsive to the computer determining that the intermediate representation node is an assignment of one object symbol reference to another object symbol reference, placing, by the computer, a right hand side of the assignment into a web node and a left hand side of the assignment into another web node, both web nodes comprising a web of related nodes.

8. The computer-implemented method of claim 3 further comprising:
determining, by the computer, whether the intermediate representation node is an assignment of a result of a method call to an object symbol reference; and
responsive to the computer determining that the intermediate representation node is an assignment of a result of a method call to an object symbol reference, placing, by the computer, the method call into a web node and the object symbol reference into another web node, both web nodes comprising a web of related nodes.

9. The computer-implemented method of claim 3 further comprising:
determining, by the computer, whether another intermediate representation node of the plurality of intermediate representation nodes corresponding to the intermediate representation of the program exists;
responsive to the computer determining that another intermediate representation node of the plurality of intermediate representation nodes corresponding to the intermediate representation of the program does not exist, determining, by the computer that traversal of the intermediate representation of the program is completed; and
performing, by the computer, transitive closure of all constructed node webs to form a set of final node webs.

10. The computer-implemented method of claim 1 further comprising:
determining, by the computer, whether an invalid web of related nodes exists in the set of final node webs; and
responsive to the computer determining that an invalid web of related nodes does exist in the set of final node webs, stopping, by the computer, the vectorization and the scalarization of methods of the program.

11. The computer-implemented method of claim 10 further comprising:
responsive to the computer determining that an invalid web of related nodes does not exist in the set of final node webs, determining, by the computer, whether one web node includes a vector length and only one vector length value is specified in the set of final node webs;
responsive to the computer determining that one web node does include the vector length and only one vector length value is specified in the set of final node webs, selecting, by the computer, a web node in the set of final node webs; and
determining, by the computer, whether the vectorization of a method corresponding to the web node is supported by the computer.

12. The computer-implemented method of claim 11 further comprising:

responsive to the computer determining that the vectorization of the method corresponding to the web node is supported by the computer, performing, by the computer, the vectorization of the method by converting the method into corresponding vector operation code in its intermediate representation using the vector length to accelerate execution of the method supported by the computer.

13. The computer-implemented method of claim 11 further comprising:
responsive to the computer determining that the vectorization of the method corresponding to the web node is unsupported by the computer, performing, by the computer, the scalarization of the method by converting the method into a corresponding sequence of scalar operation codes in their intermediate representations using the vector length to accelerate execution of the method unsupported by the computer.

14. A computer system for vectorization and scalarization of methods, the computer system comprising:
a bus system;
a storage device connected to the bus system, wherein the storage device stores program instructions; and
a processor connected to the bus system, wherein the processor executes the program instructions to:
construct a plurality of node webs based on traversing an intermediate representation of a program;
perform transitive closure of the plurality of node webs to form a set of final node webs corresponding to the program;
determine that each respective node in the set of final node webs corresponding to the program can be converted into one of vector operation code in its intermediate representation or a sequence of scalar operation codes in their intermediate representations based on at least one node including a specified vector length and only one vector length value being specified within the set of final node webs; and
convert each respective node in the set of final node webs corresponding to the program into one of corresponding vector operation code in its intermediate representation or a corresponding sequence of scalar operation codes in their intermediate representations to accelerate execution of supported and unsupported methods of the program by the computer system to increase performance of the computer system.

15. The computer system of claim 14, wherein the processor further executes the program instructions to:
receive an input to perform the vectorization and the scalarization of the methods of the program, the program corresponding to a service hosted by the computer system;
assign a method identifier to each method included in an application programming interface library associated with the program to identify each respective method in its intermediate representation; and
add each method included in the application programming interface library associated with the program to a method table indexed by the method identifier corresponding to each respective method, the method table containing properties of respective methods regarding whether a particular method has an associated vector object reference argument that is a vector species class, whether the particular method returns a vector object, and whether the particular method is supported on the computer system.

16. A computer program product for vectorization and scalarization of methods, the computer program product comprising a computer-readable storage medium having program instructions embodied therewith, the program instructions executable by a computer to cause the computer to perform a method of:
constructing, by the computer, a plurality of node webs based on traversing an intermediate representation of a program;
performing, by the computer, transitive closure of the plurality of node webs to form a set of final node webs corresponding to the program;
determining, by the computer, that each respective node in the set of final node webs corresponding to the program can be converted into one of vector operation code in its intermediate representation or a sequence of scalar operation codes in their intermediate representations based on at least one node including a specified vector length and only one vector length value being specified within the set of final node webs; and
converting, by the computer, each respective node in the set of final node webs corresponding to the program into one of corresponding vector operation code in its intermediate representation or a corresponding sequence of scalar operation codes in their intermediate representations to accelerate execution of supported and unsupported methods of the program by the computer to increase performance of the computer.

17. The computer program product of claim 16 further comprising:
receiving, by the computer, an input to perform the vectorization and the scalarization of the methods of the program, the program corresponding to a service hosted by the computer;
assigning, by the computer, a method identifier to each method included in an application programming interface library associated with the program to identify each respective method in its intermediate representation; and
adding, by the computer, each method included in the application programming interface library associated with the program to a method table indexed by the method identifier corresponding to each respective method, the method table containing properties of respective methods regarding whether a particular method has an associated vector object reference argument that is a vector species class, whether the particular method returns a vector object, and whether the particular method is supported on the computer.

18. The computer program product of claim 16 further comprising:
generating, by the computer, an intermediate representation of the program that includes a plurality of intermediate representation nodes;
traversing, by the computer, the intermediate representation of the program prior to performing a set of just in time compilation optimizations on the program; and
selecting, by the computer, an intermediate representation node of the plurality of intermediate representation nodes corresponding to the intermediate representation of the program.

19. The computer program product of claim 18 further comprising:
determining, by the computer, whether the intermediate representation node is a call to a recognized method;
responsive to the computer determining that the intermediate representation node is not a call to a recognized method, determining, by the computer, that the intermediate representation node is a call to an unrecognized method;

invalidating, by the computer, a set of vector object reference arguments associated with the unrecognized method; and placing, by the computer, web nodes corresponding to the unrecognized method and its associated set of invalidated vector object reference arguments in an invalid web of related nodes.

20. The computer program product of claim 18 further comprising:

determining, by the computer, whether the intermediate representation node is a call to a recognized method; and responsive to the computer determining that the intermediate representation node is a call to a recognized method, placing, by the computer, web nodes corresponding to the recognized method and its associated set of vector object reference arguments in a web of related nodes.

\* \* \* \* \*